United States Patent [19]
Wakamatsu

[11] Patent Number: 5,804,289
[45] Date of Patent: Sep. 8, 1998

[54] ALUMINUM NITRIDE JUNCTION STRUCTURE

[75] Inventor: Tetsuo Wakamatsu, Tokuyama, Japan

[73] Assignee: Tokuyama Corporation, Tokyo, Japan

[21] Appl. No.: 684,095

[22] Filed: Jul. 19, 1996

[30] Foreign Application Priority Data

Jul. 19, 1995 [JP] Japan ................................ 7-182517

[51] Int. Cl.$^6$ ................................................. C04B 35/58
[52] U.S. Cl. .......................... 428/212; 428/698; 156/89; 156/242; 156/277; 156/281; 156/325
[58] Field of Search ............................. 501/96, 98, 152; 428/698, 212; 156/89, 242, 277, 281, 325

[56] References Cited

U.S. PATENT DOCUMENTS

| | | | |
|---|---|---|---|
| 4,642,298 | 2/1987 | Kuramoto et al. | 501/96 |
| 4,796,077 | 1/1989 | Takeda et al. | 501/88 |
| 4,803,183 | 2/1989 | Schwetz et al. | 501/96 |
| 4,883,780 | 11/1989 | Kasori et al. | 501/96 |
| 5,077,245 | 12/1991 | Miyahara | 501/152 |
| 5,096,863 | 3/1992 | Fukushima . | |
| 5,393,715 | 2/1995 | Nakahata et al. | 501/98 |
| 5,508,240 | 4/1996 | Komatsu et al. | 501/96 |

FOREIGN PATENT DOCUMENTS 05254947  10/1993  Japan .

*Primary Examiner*—Archene Turner
*Attorney, Agent, or Firm*—Sherman and Shalloway

[57] ABSTRACT

The present invention relates to a novel aluminum nitride junction structure, which is a aluminum nitride junction structure in which the junction portion between the base materials of a sintered product of aluminum nitride comprises the sintered product of aluminum nitride, and exhibits a heat conductivity of not smaller than 95% of the heat conductivity of the base materials. More specifically, the invention relates to an aluminum nitride junction structure which does not almost permit the heat conductivity to drop at the junction portion and features a high junction strength, and to a method of producing the aluminum nitride junction structure.

13 Claims, 2 Drawing Sheets

ALUMINUM NITRIDE JUNCTION STRUCTURE

BACKGROUND OF THE INVENTION

1. (Field of the Invention)

The present invention relates to a novel aluminum nitride junction structure. More specifically, the invention relates to an aluminum nitride junction structure which does not almost permit the heat conductivity to drop at the junction portion and features a high junction strength, and to a method of producing the aluminum nitride junction structure.

2. (Prior Art)

Owing to its high heat conductivity and high electrically insulating property, the sintered product of aluminum nitride has been used as a heat-radiating member for a variety of devices and equipment. However, the shapes of the structures of the aluminum nitride used as the heat-radiating members are not always as simple as plates or poles but are often complex as represented by hollow members or solid bodies having complicated surfaces.

FIG. 1 is a perspective view illustrating a heat-radiating member having the shape of a hollow member. In FIG. 1, a heat medium is fed into the hollow member 1 through a liquid feed port 2 and is taken out through a liquid drain port 2' after having exchanged the heat.

It is difficult to produce the hollow heat-radiating member shown in FIG. 1 as an integrally molded article. When it is attempted to produce the hollow heat-radiating member by the method of integral molding, it becomes necessary to produce, first, masses composed of the sintered product of aluminum nitride having the same outer shape, and grind the inner portions thereof. This method, however, is accompanied by such problems as poor production efficiency, low yield and high production cost.

In order to produce a structure composed of the sintered product of aluminum nitride of a complex shape, therefore, a method has been contrived to separately produce parts 1-A and 1-B of a simple shape that can be integrally molded, and join them together to obtain the structure.

Various methods have heretofore been proposed for joining the parts together as follows:

1. A method of joining the sintered products of aluminum nitride by using a glass material such as lead glass (Japanese Laid-Open Patent Publication No. 88471/1990);
2. A method of joining the sintered products of aluminum nitride by using a soldering material such as silver solder containing titanium, and a resin such as silicone resin, epoxy resin or the like resin;
3. A method of joining the sintered products of aluminum nitride relying upon the diffusion junction by the diffusion of grain boundary phases of aluminum nitride by heating the junction surfaces which are intimately adhered to each other (Japanese Laid-Open Patent Publication No. 124778/1990); and
4. A method in which a paste is applied to the junction surfaces of ceramic green materials that are to be joined, the paste containing a powder of a composition same as that of the ceramic green materials and a binder, the green materials are intimately adhered together on the junction surfaces and are dried, and are then subjected to a cold isostatic press working and to the sintering (Japanese Laid-Open Patent Publication No. 254947/1993).

However, the junction structure obtained by joining the sintered products of aluminum nitride using a glass material according to the above-mentioned method 1, has a problem in that the heat conductivity which is an important property of the sintered product of aluminum nitride is lost at the junction portion since the heat conductivity of the glass material is lower than that of the sintered product of aluminum nitride. A drop of heat conductivity at the junction portion becomes a fatal defect in the applications of heat-radiating parts. That is, in a heat-radiating part consisting of the hollow material, the heat is exchanged between the heat medium inside the hollow material and the solid material such as semiconductor element in contact with the flat outer surface of the hollow material through the wall of the hollow material. In this case, when the temperature of the solid material in contact with the outer surface of the hollow material rises, the heat diffuses through the wall of the hollow material and is exchanged by the heat medium inside the hollow member. Here, if there exists a junction portion having a low heat conductivity in the wall that constitutes the hollow member, diffusion of heat is impaired in the junction portion, and the heat-radiating part loses its performance.

With the junction structure obtained by joining the sintered products of aluminum nitride by using a soldering material as a joining material according to the above-mentioned method 2, not only the electrically insulating property of the sintered product of aluminum nitride is impaired at the junction portion but also resistance against thermal shock is deteriorated due to a difference in the coefficient of thermal expansion between the aluminum nitride and the soldering material. In the case of the junction structure obtained by joining the sintered products of aluminum nitride using a resin as a junction material, on the other hand, the heat conductivity is impaired at the junction portion. Besides, the junction portion exhibits strength and heat resistance which are inferior to those of the sintered product of aluminum nitride (hereinafter referred to as "base material").

According to the above-mentioned junction method 3 based upon the diffusion, it is necessary to machine the junction surfaces maintaining a high precision to accomplish intimate adhesion between the junction surfaces of the sintered products of aluminum nitride prior to effecting the junction and to effect the heat treatment for accomplishing the junction. It is, however, difficult to execute the above-mentioned treatments until satisfactory heat conductivity and adhesion strength are accomplished.

In the case of the junction structure obtained by pressing the ceramic green materials to each other via a paste which contains a powder of the same composition as that of the green materials and a binder, followed by sintering, the junction portion exhibits a strength to a sufficient degree but also exhibits insufficient heat conductivity still leaving room for improvements.

SUMMARY OF THE INVENTION

It is therefore an object of the present invention to provide a junction structure of a sintered product of aluminum nitride exhibiting excellent heat conductivity at the junction portion.

Another object of the present invention is to provide a method of easily producing the junction structure.

Other objects and advantages of the invention will become obvious from the following description.

In order to accomplish the above-mentioned objects, the present inventors have succeeded in obtaining an aluminum nitride junction structure having a very high heat conductivity at the junction portion by applying a paste onto at least one junction surface of two or more green materials of aluminum nitride, the paste having the same composition as the green materials, and by defoaming the paste and intimately adhering the green materials at the junction surfaces thereof, followed by drying, dewaxing and sintering, and have thus arrived at the present invention.

That is, the present invention is concerned with an aluminum nitride junction structure in which the junction portion between the base materials of a sintered product of aluminum nitride comprises the sintered product of aluminum nitride, and exhibits a heat conductivity of not smaller than 95% of the heat conductivity of the base materials.

The present invention further provides a method of producing an aluminum nitride junction structure by applying a paste containing a solid component of aluminum nitride as a main component onto the junction surfaces of at least one of two or more green materials of aluminum nitride, defoaming the paste, and intimately adhering the green materials on the junction surfaces followed by drying, dewaxing and sintering.

In the present invention, the heat conductivity is measured in compliance with JIS R 1611 (one-dimensional laser flash method).

Figure 1:
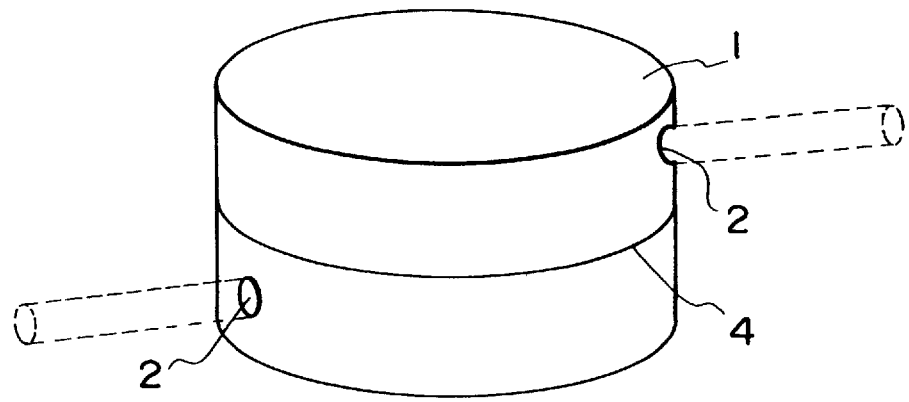
FIGS. 1 and 3 are perspective views illustrating a representative embodiment of a junction structure to which the present invention is favorably applied.

In these drawings, reference numeral 1 denotes a junction structure made up of a hollow member, 1-A and 1-B denote parts of the junction structure 1, reference numeral 2 denotes a liquid feed port, 2' denotes a liquid drain port, 3 denotes a junction structure of a solid body having complicated surfaces, 3-A, 3-B and 3-C denote parts of the junction structure 3, and reference numeral 4 denotes a junction portion.

DETAILED DESCRIPTION OF THE INVENTION

Figure 2:
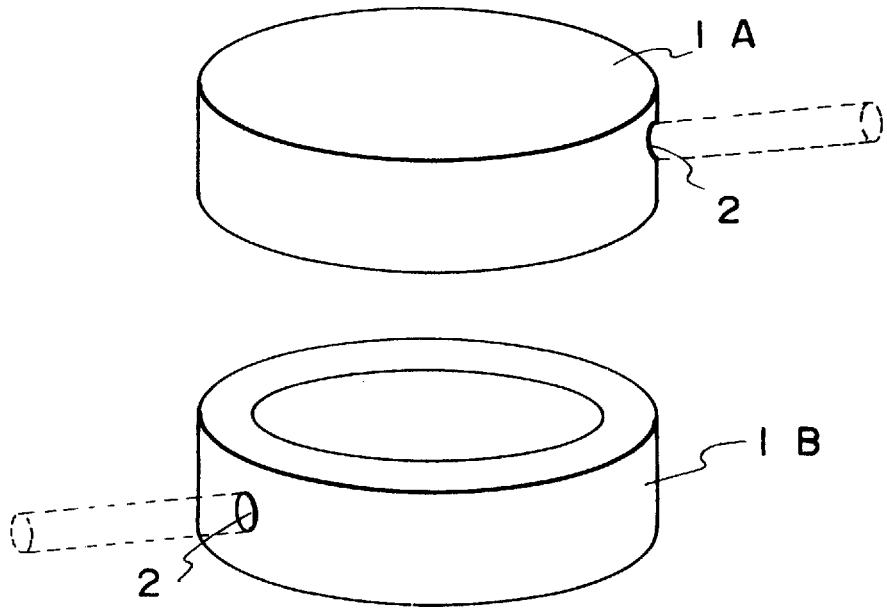
FIGS. 2 and 4 are perspective views illustrating a state of before joining the junction structure.
Figure 3:
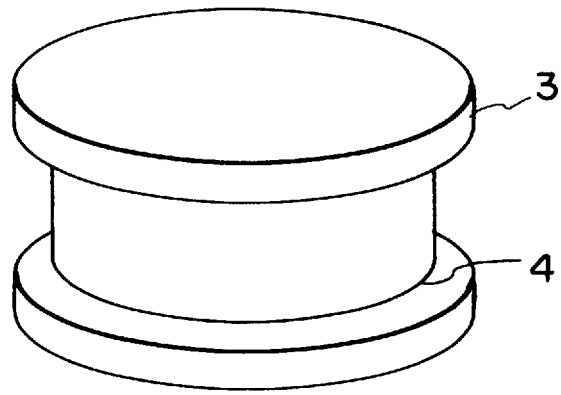

According to the present invention, there is no particular limitation in the shape of the aluminum nitride junction structure. The invention encompasses, for example, a hollow member shown in FIG. 1, a solid body having complicated surfaces as shown in FIG. 2, as well as tubes, elongated materials and large structures. It is difficult to produce these structures in the form of integrally molded articles of aluminum nitride, and hence the method of the present invention is favorably applied. The aluminum nitride junction structure is joined at the junction portion 4. That is, the aluminum nitride junction structure 1 which is a hollow member shown in FIG. 1 is constituted by joining two members 1-A and 1-B together as shown in FIG. 2, and the aluminum nitride junction structure 3 which is a solid body having complicated surfaces shown in FIG. 3 is constituted by joining together two or more members (three members 3-A, 3-B and 3-C in FIG. 4) of the solid material.

The present invention can be applied without any limitation even to the structures that can be molded as a unitary structure, as a matter of course.

The aluminum nitride junction structure of the present invention has a feature in that the heat conductivity measured via the junction portion is as very high as not less than 95% of the heat conductivity of the base material which is the sintered product of aluminum nitride.

That is, no such a high heat conductivity as measured through the junction portion has been reported concerning the aluminum nitride junction structures obtained by the traditional junction methods. This high heat conductivity at the junction portion was accomplished for the first time by the method of production that will be described later.

Moreover, the aluminum nitride junction structure which exhibits such a high heat conductivity at the junction portion of the present invention also exhibits an excellent junction strength, i.e., exhibits a strength of not smaller than 20 kg/mm² in the three-point bending strength testing measured with the junction portion as a center.

Here, however, there does not necessarily exist a correlation between the bending strength and the heat conductivity which is the feature of the present invention. As shown in Comparative Examples appearing later, for example, the junction structures of the sintered product of aluminum nitride obtained by known methods exhibit low heat conductivities at the junction portions despite the bending strengths at the junction portions may become equal to the strengths of the base materials, and are not capable of accomplishing the objects of the present invention.

Observation using a scanning-type electron microscope reveals that the interface of the junction portion of the aluminum nitride junction structure of the present invention is completely disappearing and has been homogenized to a degree that is not discernible.

The above-mentioned aluminum nitride junction structure of the present invention can be produced by a method described below.

That is, a paste containing a powder of aluminum nitride as a main component is applied to the junction surfaces of at least one of two or more green materials of aluminum nitride, and is defoamed and, then, the green materials are intimately adhered together on the junction surfaces, followed by drying, dewaxing and sintering.

Figure 4:
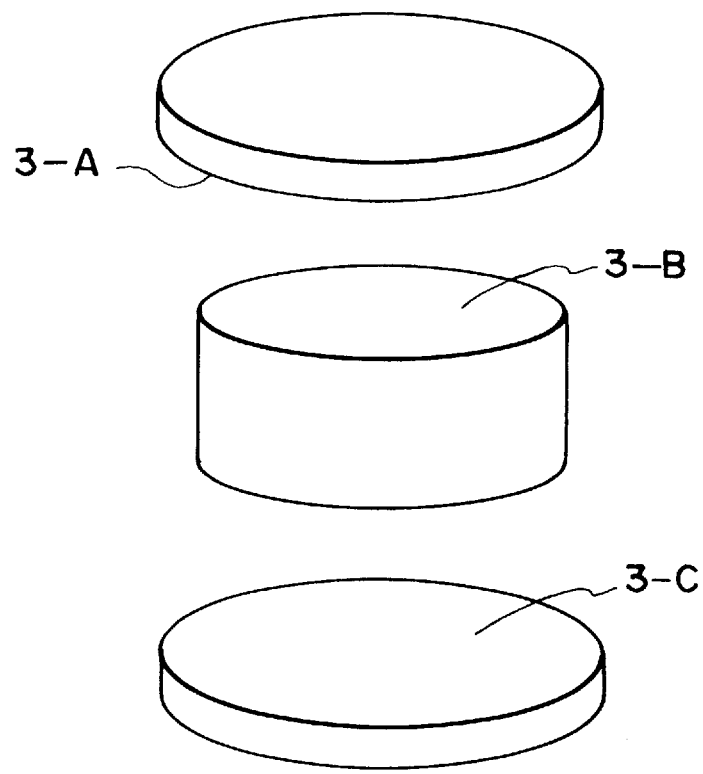

The green materials of aluminum nitride used for the above-mentioned method are formed as parts for constituting the desired aluminum nitride junction structure. To obtain the aluminum nitride junction structure of FIG. 1, for example, the parts are formed in the shapes of 1-A and 1-B as shown in FIG. 2. To obtain the aluminum nitride junction structure of FIG. 3, furthermore, the parts are formed in the shapes of 3-A, 3-B and 3-C as shown in FIG. 4.

To obtain a long product though it is not diagramed, short parts of a green material are formed in a plural number and are joined together by a method described later to form a long material.

To obtain a large molded article, parts of a size that can be easily and integrally molded are formed separately and are joined together by a method described later to form a large molded article.

The composition of the green material comprises a powder of aluminum nitride and an organic binder, which, as required, is blended with a sintering additive and a plasticizer. Any widely known organic binder can be used, such as polyvinyl butyral, polymethyl methacrylate, carboxymethyl cellulose, polyvinyl pyrrolidone, polyethylene glycol, polyethylene oxide, polyethylene, polypropylene, ethylenevinyl acetate copolymer, polystyrene, acrylic resin, ethyl cellulose or waxes. Examples of the sintering additive include alkaline earth metal compounds such as magnesium oxide, calcium oxide and strontium oxide; rare earth element compounds such as yttrium oxide, lanthanum oxide, erbium oxide, ytterbium oxide, holmium oxide, dysprosium oxide and gadolinium oxide; and composite oxides such as calcium aluminate and the like, which may be used in one kind or in two or more kinds in combination. Examples of the plasticizer include those of the phthalic acid type, glycol type, etc.

The green material may be blended with the organic binder in an amount large enough for maintaining the strength of the green material, i.e., in an amount of at least not smaller than 1% by weight and, more preferably, not smaller than 4% by weight in order to prevent the paste which is applied to the junction surfaces of the green material and contains the powder of aluminum nitride as a main component from drying as the vehicle in the paste is absorbed by the green material and to maintain the time for effecting the defoaming. The blending amount may be suitably selected within the above-mentioned range depending upon the molding method. In order to avoid the effect of residual carbon at the time of dewaxing, however, the ratio of the organic binder may not be larger than 20% by weight and, particularly, not larger than 6% by weight.

It is desired that the green material is blended with the sintering additive in an amount of from 0 to 10% by weight and, particularly, from 2 to 7% by weight. It is desired that the plasticizer is contained in an amount of from 0 to 80% by weight and, particularly, from 10 to 50% by weight with respect to the organic binder.

There is no particular limitation on the method of molding the green material, and any known molding method may be employed such as hydraulic pressure press molding, cold isostatic press molding, extrusion molding, injection molding, or cast molding.

In the above-mentioned molding methods, the molding material is used in a wet powdery form obtained by adding a vehicle to the above-mentioned composition, in a paste-like form obtained by adding the vehicle to the composition, in a clay-like form or in the form of a simple mixture of powders without using vehicle. The molding material may be used in any desired form depending upon the molding method. The vehicle may be the one that easily evaporates generally having a boiling point of lower than 150° C., and, particularly, not larger than 120° C. A preferred example of the vehicle is an organic solvent that does not react with aluminum nitrogen and is, generally, toluene, ethyl alcohol or isopropyl alcohol.

In the method of producing the aluminum nitride junction structure of the present invention, a paste which contains the powder of aluminum nitride as a main component and a vehicle, is applied without any particular limitation to the junction surfaces of the green materials of the aluminum nitride. Concerning the solid components excluding the organic compound such as organic binder, it is desired that the paste has a composition containing the same solid components as the green material, e.g., containing the sintering additive at the same ratio with respect to the aluminum nitride.

As the vehicle for constituting the paste, use is generally made of an organic solvent which does not react with the aluminum nitride. Particularly preferably, use is made of a vehicle generally having a boiling point of not lower than 150° C. and, particularly, not lower than 180° C., which little evaporates and little dries at room temperature, so that the vehicle is not dried within a period of deforming time during the defoaming treatment that will be described later. Concrete examples include terpineol and n-butylcarbitol acetate.

The concentration of the solid components in the paste cannot be exclusively determined since it varies depending upon the method of applying the paste onto the green material, but is desirably from about 40 to about 85% by weight. At the above-mentioned concentration of solid components, furthermore, the paste preferably has a viscosity of from 10,000 to 150,000 centipoises and, particularly, from 20,000 to 50,000 centipoises. When the viscosity is smaller than 10,000 centipoises, coating having a sufficient thickness is not obtained on the junction surfaces by one time of application. When the paste has a viscosity in excess of 150,000 centipoises, an extended period of time is required for the defoaming in the defoaming treatment that will be described later. Or, depending upon the cases, defoaming is not effected to a sufficient degree.

According to the present invention, furthermore, the paste to be applied to the junction surfaces is better defoamed prior to being applied, so that the defoaming can be efficiently executed during the deforming treatment that will be described later and that little defect occurs at the junction portion of the obtained aluminum nitride junction structure.

In the method of producing the aluminum nitride junction structure according to the present invention, the paste is applied to the junction surfaces of the green materials. The paste may be applied to the junction surfaces of at least either one side but is more desirably applied to the junction surfaces of the two sides.

The paste can be applied to the green material by a known method such as brush coating method, roller coating method, dipping method, spraying method, printing method or spin coating method. Desirably, the roller coating method and the dipping method are preferred since these methods make it possible to obtain a coating maintaining a uniform thickness. More preferably, it is desired to use the coating method based on the printing from the standpoint of uniformalizing the thickness of the paste.

Though there is no particular limitation on the thickness of the paste applied onto the surfaces of the green materials, it is desired that the paste is applied in a thickness which makes it possible to maintain the wet state for not less than one minute and, preferably, for not less than three minutes from the standpoint of removing bubbles from the paste during the defoaming treatment that will be described later and of smoothing the surface, making it possible, maintaining good reproduceability, to obtain the aluminum nitride junction structure which exhibits a heat conductivity as measured through the junction portion of not smaller than 95% of the heat conductivity of the base material.

The thickness of the paste cannot be definitely determined due to the boiling point of the vehicle constituting the paste but is generally from 20 to 500 $\mu$m and, preferably, from 50 to 300 $\mu$m. That is, the paste that is applied dries predominantly as the vehicle is absorbed by the green material rather than as the vehicle evaporates. In order to suppress the applied paste from drying, therefore, the paste must have a given amount of thickness.

In the production method of the present invention, the defoaming treatment will be a method of removing bubbles contained in the paste applied to the surface of the green materials without any particular limitation. Under normal pressure, it is desired that the paste that is applied is left to stand for not less than 2 minutes, more preferably, for not less than 3 minutes and, particularly preferably, for not less than 5 minutes. When left to stand under a reduced pressure, the above-mentioned time can be shortened. When the defoaming is to be carried out under a reduced pressure, it is desired that the pressure is from 10 to 700 mmHg, and preferably from 20 to 260 mmHg.

The temperature of the defoaming treatment is usually near room temperature, and is from 0° to 50° C. and, preferably, from 10° to 25° C.

After the defoaming treatment, the adhesion surfaces of the green materials are intimately adhered to each other before the paste applied to the green materials is dried, i.e., in a state where the surfaces of the green materials are wet with the paste. The pressure for intimate adhesion will lie over a range which does not cause the green materials to be damaged and, generally, from 10 to 1000 g/cm² and, particularly, from 15 to 200 g/cm².

Next, the green materials of which the junction surfaces are intimately adhered together are subjected to the drying, dewaxing and sintering.

The drying, dewaxing and sintering can be executed under known conditions without any particular limitation.

For instance, it is desired that the drying is effected in a temperature range of from room temperature to not higher than a boiling point of the vehicle that is used.

It is desired that the dewaxing is effected in an inert atmosphere such as nitrogen or the like or in the air. The dewaxing temperature is selected out of a range of from 300° to 1000° C. depending upon the atmosphere.

Moreover, the sintering is effected in a non-oxidizing atmosphere such as of nitrogen at a temperature selected out of a range of from 1700° to 1950° C.

The thus prepared aluminum nitride structure has a junction portion exhibiting a heat conductivity and a strength that are very little different from those of the base material.

The junction interface of the thus produced aluminum nitride junction structure of the invention is completely disappearing and has been homogenized to a degree that cannot be discerned as observed using a scanning-type electron microscope.

It is presumed that with the paste containing the organic binder and the powder of the same composition as that of the powder constituting the green materials, being applied onto the surfaces of the green materials, fine ruggedness on the surfaces of the green materials is filled with the paste and, besides, the paste infiltrates into the green materials from the surfaces thereof, causing the junction interface between the paste and the green materials to disappear and the junction structure to turn into an integrally molded article.

Defoaming the paste forming the junction portion makes it possible to eliminate defect at the junction portion and to obtain an aluminum nitride junction structure having a junction portion exhibiting a high heat conductivity and a large strength.

In the aluminum nitride junction structure of the present invention as will be comprehended from the foregoing description, the junction portion exhibits the heat conductivity which is very little decreased compared with that of the sintered product of aluminum nitride which is the base material and further exhibits a large junction strength. Moreover, the aluminum nitride junction structure can be produced very simply by the above-mentioned method.

EXAMPLES

Described below are examples for concretely explaining the present invention which, however, is in no way limited to these examples only.

In examples, the heat conductivity of the sintered product of aluminum nitride was measured by using LF/TCM FA8510B (manufactured by Rigaku Denki Co.) in compliance with the one-dimensional laser flash method. The three-point bending strength was measured in compliance with JIS R1601.

(Example 1)

An aluminum nitride junction structure shown in FIG. 1 was produced by a method described below.

A composition comprising 100 parts by weight of an aluminum nitride powder (grade H produced by Tokuyama Co.), 5 parts by weight of a fine yttrium oxide powder as a sintering additive and 4 parts by weight of a methyl acrylate ester as an organic binder, was charged into a metal mold and was press-molded under a pressure of 1000 kg/cm² to mold two green materials in the form of a laboratory dish as shown in FIG. 2. Then, a hole for attaching a pipe was formed in the side surfaces of the green materials.

A paste was prepared by mixing together 100 parts by weight of aluminum nitride, 5 parts by weight of a fine yttrium oxide powder as a sintering additive, 3 parts by weight of ethyl cellulose (of a grade of 4 centipoises) as an organic binder, and 50 parts by weight of terpineol as a vehicle. The obtained paste exhibited a viscosity of 20,000 centipoises.

The thus obtained paste was printed onto the junction surfaces of the green materials maintaining a thickness of about 70 μm by using a screen of 80 meshes.

After printed, the paste was left to stand still under a reduced pressure of 260 mmHg for 2 minutes and as defoamed, in order to remove bubbles from the printed paste and to smooth the surface of the paste. The junction surfaces of the green materials were then intimately adhered together under a pressure of 30 g/cm².

The green materials intimately adhered together were dried a whole day and night at room temperature, dewaxed in the open atmosphere at 600° C., and was sintered in a nitrogen atmosphere at 1830° C. to obtain an aluminum nitride junction structure.

The heat conductivity of the thus obtained aluminum nitride junction structure was measured according to the one-dimensional method. The sample for measurement possessed a size of 10 mm in diameter and 4 mm in thickness, included a junction portion of the aluminum nitride junction structure as obtained above, and was so cut that the junction portion was at the center of the thickness of the sample.

There was also prepared a sample of the same size being composed of a base material without containing the junction portion, and its heat conductivity was measured. To measure the bending strength of the junction portion, a sample was so prepared that the junction portion was located at the center, and the strength was measured relying upon the three-point bending method. The results were as shown in Table 1.

The junction portion exhibited a heat conductivity which was 100% that of the base material and a bending strength which was 99% that of the base material.

(Comparative Example 1)

In Example 1, the paste was printed on the junction surfaces of the green materials. Then, the junction surfaces of the two green materials were intimately adhered together under a pressure of 30 g/cm² without effecting the defoaming.

An aluminum nitride junction structure was obtained through drying, dewaxing and sintering in the same manner as in Example 1.

The thus obtained aluminum nitride junction structure was measured for its heat conductivity and bending strength in the same manner as in Example 1. The results were as shown in Table 1.

The junction portion exhibited a heat conductivity which was 90% of that of the base material and a bending strength which was 47% of that of the base material.

(Example 2)

An aluminum nitride junction structure was obtained in the same manner as in Example 1 but effecting the defoaming under normal pressure for 3 minutes after the paste has been applied onto the junction surfaces of the green materials.

The obtained aluminum nitride junction structure was measured for its heat conductivity and bending strength at the junction portion in the same manner as in Example 1. The results were as shown in Table 1.

The junction portion exhibited a heat conductivity equal to that of the base material and a bending strength which was 88% of that of the base material.

(Example 3)

An aluminum nitride junction structure was obtained in the same manner as in Example 1 but effecting the defoaming under normal pressure for 7 minutes after the paste has been applied onto the junction surfaces of the green materials.

The obtained aluminum nitride junction structure was measured for its heat conductivity and bending strength at the junction portion in the same manner as in Example 1. The results were as shown in Table 1.

The junction portion exhibited a heat conductivity equal to that of the base material and a bending strength which was 96% that of the base material.

(Example 4)

Two green materials having the same composition as the green materials of Example 1 and measuring 50×40 ×15 mm were molded in the same manner as the method of Example 1. Like in Comparative Example 1, the same paste as that of Example 1 was printed on the junction surfaces of 50×15 mm of the green materials.

After printed, the paste was left to stand still under normal pressure for 3 minutes and was defoamed, in order to remove bubbles from the printed paste and to smooth the surface of the paste. The junction surfaces of the two green materials were then intimately adhered together under a pressure of 30 g/cm$^2$.

The green materials intimately adhered together were dried a whole day and night at room temperature, and was subjected to the cold isostatic press work (1000 kgf/cm$^2$ for 60 seconds).

The green materials thus intimately adhered together were dewaxed and sintered under the same conditions as in Example 1 to obtain an aluminum nitride junction structure.

The thus obtained aluminum nitride junction structure was measured for its heat conductivity and bending strength at the junction portion in the same manner as in Example 1. The results were as shown in Table 1.

The junction portion exhibited a heat conductivity which was equal to that of the base material and a bending strength which was 99% that of the base material.

(Comparative Example 2)

In Example 4, the paste was printed on the junction surfaces of the green materials. Then, the junction surfaces of the two green materials were intimately adhered together under a pressure of 30 g/cm$^2$ without effecting the defoaming.

An aluminum nitride junction structure was obtained through drying, dewaxing and sintering in the same manner as in Example 4.

The thus obtained aluminum nitride junction structure was measured for its heat conductivity and bending strength in the same manner as in Example 4. The results were as shown in Table 1.

The junction portion exhibited a heat conductivity which was 91% that of the base material and a bending strength which was 97% that of the base material.

TABLE 1

|  | Defoaming time (min) | Cold isostatic pressure | Heat conductivity (W/m · K) | Bending strength (kg/mm$^2$) |
| --- | --- | --- | --- | --- |
| Base material | — | — | 178 | 33.4 |
| Example 1 | 2*$^{1)}$ | no | 178 | 33.0 |
| Comp. Ex. 1 | 0 | no | 161 | 15.6 |
| Example 2 | 3 | no | 178 | 29.4 |
| Example 3 | 7 | no | 178 | 31.7 |
| Example 4 | 3 | yes | 178 | 33.2 |
| Comp. Ex. 2 | 0 | yes | 162 | 32.3 |

*$^{1)}$Defoamed under a reduced pressure.
Comp. Ex.: Comparative Example

I claim:

1. An aluminum nitride junction structure in which the junction portion between and joining at least two base materials of a sintered product of aluminum nitride comprises the same sintered material as the sintered product of aluminum nitride base materials, and the junction portion exhibits a heat conductivity of not smaller than 95% of the heat conductivity of the base materials.

2. An aluminum nitride junction structure according to claim 1, wherein the junction portion has a three-point bending strength not smaller than 20 kg/mm$^2$ as measured with the junction portion as a center.

3. An aluminum nitride junction structure according to claim 1, wherein the aluminum nitride junction structure comprises at least two base materials joined by the junction portion to form a hollow member.

4. A method of producing an aluminum nitride junction structure of claim 1 by applying a paste containing a solid component of aluminum nitride as a main component onto the junction surfaces of at least one of two or more green materials of aluminum nitride, defoaming the paste, and intimately adhering the green materials on the junction surfaces followed by drying, dewaxing and sintering.

5. A method of producing an aluminum nitride junction structure according to claim 4, wherein the paste has a viscosity of from 10,000 to 150,000 centipoises.

6. A method of producing an aluminum nitride junction structure according to claim 4, wherein the paste is applied onto the junction surfaces of the green materials by a printing method.

7. A method of producing an aluminum nitride junction structure according to claim 4, wherein said paste is obtained by adding a vehicle having a boiling point of not lower than 150° C. to a powder of aluminum nitride.

8. An aluminum nitride junction structure in which the junction portion between and joining at least two base materials of a sintered product consisting essentially of aluminum nitride comprises the same sintered material as the sintered product of aluminum nitride base material, and the junction portion exhibits a heat conductivity of not smaller than 95% of the heat conductivity of the base materials, wherein the junction portion has a three-point bending strength not smaller than 20 kg/mm² as measured with the junction portion as a center.

9. An aluminum nitride junction structure according to claim 8, wherein the aluminum nitride junction structure is a hollow member.

10. An aluminum nitride junction structure in which the junction portion between and joining at least two base materials of a sintered product of aluminum nitride comprises the same sintered material as the sintered product of aluminum nitride base material, and the junction portion exhibits a heat conductivity of not smaller than 95% of the heat conductivity of the base materials, wherein the junction portion has a three-point bending strength not smaller than 20 kg/mm² as measured with the junction portion as a center, and wherein the aluminum nitride sintered junction structure is prepared by applying a paste containing a solid component of aluminum nitride comprising the same material as the base material as the main component onto the junction surfaces of at least one of two or more green base materials of aluminum nitride, defoaming the paste, and intimately adhering the green materials on the junction surfaces followed by drying, dewaxing and sintering the junction structure.

11. The aluminum nitride junction structure of claim 10, wherein the paste has a viscosity of from 10,000 to 150,000 centipoises.

12. The aluminum nitride junction structure of claim 10, wherein said paste is obtained by adding a vehicle having a boiling point of not lower than 150° C. to a powder of aluminum nitride.

13. An aluminum nitride junction structure according to claim 10, wherein the aluminum nitride junction structure is a hollow member.

* * * * *